United States Patent
Black et al.

(10) Patent No.: US 10,831,902 B2
(45) Date of Patent: *Nov. 10, 2020

(54) DATA VERIFICATION METHODS AND SYSTEMS USING A HASH TREE, SUCH AS A TIME-CENTRIC MERKLE HASH TREE

(71) Applicant: tZERO Group, Inc., New York, NY (US)

(72) Inventors: Tron Black, Sandy, UT (US); Alec Wilkins, Salt Lake City, UT (US); Robert Christensen, Sandy, UT (US)

(73) Assignee: tZERO Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,979

(22) Filed: May 24, 2019

(65) Prior Publication Data

US 2019/0278920 A1 Sep. 12, 2019

Related U.S. Application Data

(63) Continuation of application No. 14/852,955, filed on Sep. 14, 2015, now Pat. No. 10,303,887.

(51) Int. Cl.
*G06F 16/21* (2019.01)
*G06F 21/60* (2013.01)
*G06F 21/64* (2013.01)
*H04L 9/32* (2006.01)

(52) U.S. Cl.
CPC .......... *G06F 21/602* (2013.01); *G06F 21/64* (2013.01); *H04L 9/3239* (2013.01); *H04L 9/3297* (2013.01); *H04L 2209/38* (2013.01)

(58) Field of Classification Search
CPC ...... G06F 21/602; G06F 21/64; G06F 16/137; H04L 9/3297; H04L 2209/38; H04L 9/3239

(Continued)

(56) References Cited

U.S. PATENT DOCUMENTS 5,077,665 A 12/1991 Silverman et al.
5,924,083 A 7/1999 Silverman et al.
(Continued)

FOREIGN PATENT DOCUMENTS

CN 102413313 A 4/2012
CN 101853190 B 7/2012
CN 103218574 A 7/2013

OTHER PUBLICATIONS

Baird, "The Swirlds Hashgraph Consensus Algorithm: Fair, Fast, Byzantine Fault Tolerance", Swirlds Tech Report SWIRLDS-TR-2016-01, "http://www.swirlds.com/downloads/SWIRLDS-TR-2016-01.pdf", dated May 31, 2016, Retrieved on Mar. 27, 2018, pp. 1-28.

(Continued)

*Primary Examiner* — Usmaan Saeed
*Assistant Examiner* — David M Nafziger
(74) *Attorney, Agent, or Firm* — Fogg & Powers LLC

(57) ABSTRACT

Systems and methods described herein generally relate to storing and verifying data. In some embodiments, reference levels are generated according to time intervals, where the first reference level comprises a predetermined number of the time intervals, and where each of the time intervals of the remaining reference levels is comprised of a predetermined number of the time intervals of a previous reference level. Hashes of data can be created at the first reference level by performing a hashing function on the data in a time-sequenced manner. First reference level time interval hashes may be generated by performing the hashing function on the hashes of the data at each of the time intervals of the first reference level. Hashes for remaining reference level time intervals can be generated by performing the hashing function on the hashes of each of the time intervals of the previous reference level.

20 Claims, 7 Drawing Sheets

(58) Field of Classification Search
USPC .......................................................... 707/756
See application file for complete search history.

(56) References Cited

U.S. PATENT DOCUMENTS

| | | | |
|---|---|---|---|
| 6,629,082 | B1 | 9/2003 | Hambrecht et al. |
| 7,587,358 | B2 | 9/2009 | Hambrecht et al. |
| 7,634,653 | B2 | 12/2009 | Horita et al. |
| 8,055,635 | B2 | 11/2011 | Hsu et al. |
| 8,117,112 | B2 | 2/2012 | Hambrecht et al. |
| 8,204,821 | B2 | 6/2012 | Staib et al. |
| 8,719,576 | B2 | 5/2014 | Buldas et al. |
| 8,825,971 | B1* | 9/2014 | Auchmoody ....... G06F 11/1453 711/162 |
| 9,397,985 | B1 | 7/2016 | Seger, II et al. |
| 9,608,829 | B2 | 3/2017 | Spanos et al. |
| 9,704,143 | B2 | 7/2017 | Walker et al. |
| 10,303,887 | B2 | 5/2019 | Black et al. |
| 2004/0133782 | A1 | 7/2004 | Sander et al. |
| 2005/0114666 | A1 | 5/2005 | Sudia |
| 2005/0166263 | A1 | 7/2005 | Nanopoulos et al. |
| 2006/0129847 | A1* | 6/2006 | Pitsos ................... H04L 9/3236 713/193 |
| 2007/0006305 | A1 | 1/2007 | Florencio et al. |
| 2007/0300249 | A1 | 12/2007 | Smith et al. |
| 2008/0028224 | A1 | 1/2008 | Pitsos |
| 2009/0037491 | A1 | 2/2009 | Cachin et al. |
| 2010/0031035 | A1 | 2/2010 | Princen et al. |
| 2010/0031039 | A1 | 2/2010 | Ciet et al. |
| 2010/0161916 | A1 | 6/2010 | Thornton et al. |
| 2010/0212017 | A1 | 8/2010 | Li et al. |
| 2011/0099388 | A1 | 4/2011 | Hett |
| 2011/0153848 | A1* | 6/2011 | Sakakihara ........... H04L 67/104 709/228 |
| 2011/0208828 | A1* | 8/2011 | Sakakihara ......... G06F 16/2471 709/217 |
| 2012/0209822 | A1 | 8/2012 | Prabhakar et al. |
| 2013/0276058 | A1* | 10/2013 | Buldas ................ H04L 63/0876 726/2 |
| 2014/0156671 | A1 | 6/2014 | Zhu et al. |
| 2014/0245020 | A1 | 8/2014 | Buldas et al. |
| 2014/0325644 | A1* | 10/2014 | Oberg ..................... G06F 21/51 726/22 |
| 2014/0380425 | A1* | 12/2014 | Lockett ................... H04L 63/20 726/4 |
| 2015/0039893 | A1 | 2/2015 | Buldas et al. |
| 2015/0156026 | A1* | 6/2015 | Gault ................... H04L 9/3265 713/178 |
| 2015/0188715 | A1* | 7/2015 | Castellucci ........... H04L 9/3265 713/178 |
| 2015/0365242 | A1 | 12/2015 | Gault et al. |
| 2015/0370469 | A1 | 12/2015 | Leong et al. |
| 2016/0087798 | A1 | 3/2016 | Campbell |
| 2016/0204942 | A1 | 7/2016 | Bohli et al. |
| 2016/0217436 | A1 | 7/2016 | Brama |
| 2016/0224949 | A1 | 8/2016 | Thomas et al. |
| 2016/0261685 | A1 | 9/2016 | Chen et al. |
| 2016/0261690 | A1 | 9/2016 | Ford |
| 2016/0267474 | A1 | 9/2016 | Lingham et al. |
| 2016/0267566 | A1 | 9/2016 | Levitt et al. |
| 2016/0267605 | A1 | 9/2016 | Lingham et al. |
| 2016/0321751 | A1 | 11/2016 | Creighton, IV et al. |
| 2017/0075938 | A1 | 3/2017 | Black et al. |
| 2019/0042867 | A1* | 2/2019 | Chen ...................... H04W 4/70 |
| 2019/0379797 | A1* | 12/2019 | Sahagun ............ H04N 1/00241 |
| 2020/0159891 | A1* | 5/2020 | Patel ................... G06Q 10/0833 |

OTHER PUBLICATIONS

Bhanot et al, "Distributed Ledgers: Possibilities and Challenges in Capital Markets Applications", "Cognizant 20-20 Insights", "https://www.cognizant.com/whitepapers/distributed-ledgers-possibilities-and-challenges-in-capital-markets-applications-codex1974.pdf", Dated Jun. 1, 2016, Retrieved on Feb. 20, 2018, pp. 1-10, Publisher: Cognizant.

BTC Inc, "Overstock Plans to Open Blockchain-Based Stock Exchange to to Other Publicly Traded Companies", "https://distributed.com/news/overstock-plans-to-open-blockchain-based-stock-exchange-t-totother-publicly-traded-companies/", Retrieved on Mar. 27, 2018, pp. 1-6, Publisher: BTC Media.

Del Castillo, "Overstock Raises $10.9 Million in First Blockchain Stock Issuance", "CoinDesk", "https://www.coindesk.com/overstock-first-blockchain-stock-issuance/", Updated Dec. 16, 2016, Retrieved Feb. 20, 2018, pp. 1-5.

European Patent Office, "Extended European Search Report from EP Application No. 16847106.8 dated Mar. 21, 2019", from Foreign Counterpart to U.S. Appl. No. 14/852,955, pp. 1-8, Published: EP.

Finextra, "Overstock Looks to Issue Bitcoin-Style Stocks", "Finextra", "https://www.finextra.com/newsarticle/27294/overstock-looks-to-issue-bitcoin-style-stocks", Dated Apr. 29, 2015, Retrieved on Feb. 20, 2018, pp. 1-3.

Gassend et al., "Caches and Merkle Trees for Efficient Memory Authentication", "In the Proceedings of the 9th High Performance Computer Architecture Symposium (HPCA'03) 2002, Sep.", pp. 1-13, Publisher: Massachusetts Institute of Technology.

Guagliardo et al, "Blockchain and Public Securities: Shedding Light on 'Going Dark'", "Power of Intelligence, Insight Center: Publications", "http://www.pepperlaw.com/publications/blockchain-and-public-securities-shedding-light-on-going-dark-2016-09-27/", Dated Sep. 27, 2016, Retrieved on Feb. 20, 2018, pp. 1-3. Publisher: Pepper Hamilton LLC.

International Bureau, "International Preliminary Report on Patentability from PCT Application No. PCT/US2016/051301 dated Mar. 29, 2018", from Foreign Counterpart to U.S. Appl. No. 14/852,955, pp. 1-9, Published: WO.

International Searching Authority, "International Search Report and Written Opinion from PCT Application No. PCT/US2016/051301 dated Nov. 22, 2016", from Foreign Counterpart to U.S. Appl. No. 14/852,955, pp. 1-10, Published: WO.

Marcogliese et al, "Bitcoins and Blockchain—The Use of Distributed Ledger Technology for the Issuance of Digital Securities", "Cleary M & A and Corporate Governance Watch, Mergers and Acquisitions, Corporate Governance, Shareholder Activism", "Posted in SEC Guidance", "https://www.clearymawatch.com/2016/01/bitcoins-and-blockchain-the-use-of-distributed-ledger-technology-for-the-issuance-of-digital-securities/", Dated Jan. 4, 2016, Retrieved on Feb. 20, 2018, pp. 1-7. Publisher: Cleary Gottlieb Steen & Hamilton LLP.

Metz, "SEC Approves Plan to Issue Stock Via Bitcoin's Blockchain", "Wired, Business", "https://www.wired.com/2015/12/sec-approves-plan-to-issue-company-stock-via-the-bitcoin-blockchain/", Dated Dec. 15, 2016, Retrieved on Mar. 27, 2018, pp. 1-7.

Nitchman, "First Public Offering Using Blockchain Planned", "XBRL", "https://www.xbrl.org/first-public-offering-using-blockchain-planned/", Posted on Mar. 18, 2016, Retrieved on Feb. 20, 2018, pp. 1-3, Publisher: XBRL International Inc.

Prisco, "Overstock Files Crypto Stock Exchange Prospectus with the SEC", "Bitcoin Magazine", "https://bitcoinmagazine.com/articles/overstock-files-crypto-stock-exchange-prospectus-sec-1430258150/", Dated Apr. 28, 2015, Retrieved on Feb. 20, 2018, pp. 1-5.

Rahul P. Naik, "Optimising the SHA256 Hashing Algorithm for Faster and More Efficient Bitcoin Mining", "MSc Information Security Department of Computer Science UCL", Sep. 2, 2013, pp. 1-65, Published in: US.

Richards, "Wall Street Left Out in Overstock's US $500M Stocks Issue", "CoinTelegraph", "https://cointelegraph.com/news/wall-street-left-out-in-overstocks-us500m-stocks-issue", Dated Apr. 28, 2015, Retrieved on Feb. 20, 2018, pp. 1-4, Publisher: Cointelegraph.

Sammantics, "A New Approach to Consensus: Swirlds HashGraph", "http://sammantics.com/blog/2016/7/27/hashgraph-consensus", Jul. 29, 2016, Dated Jul. 29, 2016, Retrieved Mar. 27, 2018, pp. 1-28.

U.S. Patent and Trademark Office, "Final Office Action", U.S. Appl. No. 14/852,955, dated Jul. 27, 2018, pp. 1-57, Published: US.

U.S. Patent and Trademark Office, "Office Action", U.S. Appl. No. 14/852,955, dated Dec. 27, 2017, pp. 1-60, Published: US.

(56) References Cited

OTHER PUBLICATIONS

Vakta et al., "Blockchain Disruption in Security Issuance", "Capgemini", "https://www.capgemini.com/wp-content/uploads/2017/07/blockchain_securities_issuance_v6_web.pdf", Dated Jul. 12, 2017, Retrieved Mar. 27, 2018, pp. 1-16.

Van Eyk, "Overstock.com Seeks to Build New Stock Market", "Bitcoin Magazine", "https://bitcoinmagazine.com/articles/overstock-com-seeks-build-new-stock-market-1412623808/", Dated Oct. 6, 2014, Retrieved on Feb. 20, 2018, pp. 1-5.

Zacks, "MasterCard (MA) Files for Blockchain Patents, Introduces AI", "Zacks Equity Research", "https://www.yahoo.com/news/mastercard-ma-files-blockchain-patents-151203016.html", Dated Dec. 1, 2016, Retrieved on Feb. 20, 2018, pp. 1-8.

Intellectual Property Office of Singapore, "Invitation to Respond to Written Opinion and Written Opinion from SG Application No. 11201801774P dated Apr. 17, 2019", from Foreign Counterpart to U.S. Appl. No. 14/852,955, pp. 1-7, Published: SG.

U.S. Patent and Trademark Office, "Notice of Allowance", U.S. Appl. No. 14/852,955, dated Jan. 3, 2019, pp. 1-16, Published: US.

U.S. Patent and Trademark Office, "Third-Party Submission Under 37 CFR 1.290 Including Concise Description of Relevance", U.S. Appl. No. 14/852,955, dated Apr. 18, 2017, pp. 1-14, Published: US.

U.S. Patent and Trademark Office, "Response to Rule 312 Communication", U.S. Appl. No. 14/852,955, dated Apr. 26, 2019, pp. 1-7, Published: US.

Intellectual Property Office of Singapore, "Notice of Eligibility for Grant from SG Application No. 11201801774P", from Foreign Counterpart to U.S. Appl. No. 14/852,955, dated Mar. 6, 2020, pp. 1-6, Published: SG.

\* cited by examiner

DATA VERIFICATION METHODS AND SYSTEMS USING A HASH TREE, SUCH AS A TIME-CENTRIC MERKLE HASH TREE

CROSS-REFERENCE TO RELATED APPLICATION

This application is a continuation application of U.S. patent application Ser. No. 14/852,955 entitled "DATA VERIFICATION METHODS AND SYSTEMS USING A HASH TREE, SUCH AS A TIME-CENTRIC MERKLE HASH TREE" and filed on Sep. 14, 2015, which is hereby incorporated by reference in its entirety.

TECHNICAL FIELD

Various embodiments of the present disclosure generally relate to storing and verifying data. More specifically, various embodiments of the present disclosure relate to systems and methods for storing and verifying data using hashing techniques.

BACKGROUND

A hash function is a function that can be used to map digital data of arbitrary size to digital data of fixed size. Hash functions can be used for many purposes, such as to accelerate table or database look-up by detecting duplicated records in a large file. Hash functions are also used in blockchains. Blockchains are verifiable permanent ledgers constructed one block at a time with a proof-of-work seal (hash) affixed to each block that validates that block. In any blockchain, the hash of the previous block is included in the current block, and therefore by recursion the current hash also validates all previous blocks back to the original genesis block. Inserting a hash into a blockchain permanently records that hash and acts as a notary verifying the time-stamped proof of existence of the hashed data at the moment in time that the block is added to the chain. Future blocks add a layer of protection from a chain re-organization and therefore add certainty that no changes can be made to blocks earlier in the chain.

BRIEF DESCRIPTION OF THE DRAWINGS

Embodiments of the present disclosure will be described and explained through the use of the accompanying drawings.

DETAILED DESCRIPTION

Figure 1:
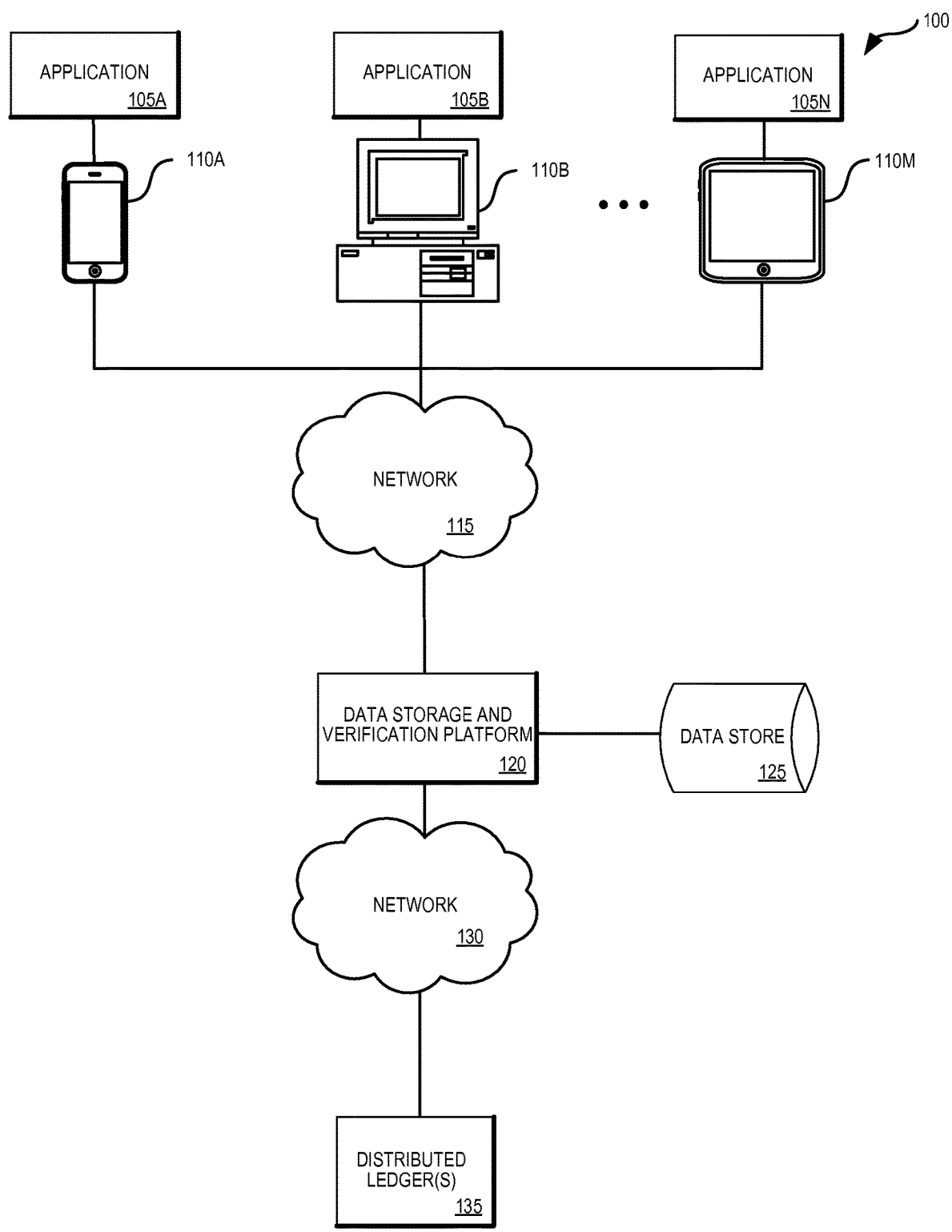
FIG. 1 illustrates an example of a network-based operating environment in accordance with various embodiments of the disclosure.

Various embodiments of the present disclosure generally relate to storing and verifying data. More specifically, various embodiments of the present disclosure relate to systems and methods for storing and verifying data using hashing techniques.

The Data Storage and Verification Platform describes a method and system in which a record of data, and particularly rapidly changing, time-sensitive data, can be generated both quickly and efficiently using the concept of a Merkle Tree where the tree branches are time-centric groupings of data.

Traditional methods of data validation are inefficient, particularly where large amounts of rapidly changing data are concerned (e.g., trading data, telemetry). For example, one solution for verifying data includes storing the entire corpus of a file or text and comparing it with the original data to confirm validity. While this method is manageable for small amounts of data, this solution is impractical for a comparison of any significant amount of data.

Another current solution is to store the data in a blockchain. But recording rapidly changing data (e.g., each trade on an exchange) in a blockchain is impractical for at least two reasons. First, the amount of data that must be synchronized and stored currently exceeds most communication channels of, most storage systems of, and the "bandwidth" of current blockchains. Put simply, rapidly changing data cannot be synchronized quickly across a widely distributed, decentralized system. Second, it is impractical to record rapidly changing data on a blockchain because the timing of a decentralized blockchain is not deterministic. That is, pathways for the data are dependent on the peer-to-peer connections which may lead to rapidly changing data being recorded in a different order than it originally occurred.

Methods and systems described herein provide a way for data, including rapidly changing, time-sensitive data, to be recorded for verification in the future. Some embodiments described herein describe a Data Storage and Verification Platform that can generate a Time Ordered Merkle Tree Epoch (TOME), where "time" may refer to an indefinite continued progress of existence and events in the past, present, and future regarded as a whole; where "ordered" may refer to being arranged in a methodical or appropriate way; where "Merkle Tree" refers to the Merkle Tree invented by Ralph Merkle, in which each non-leaf node is labeled with the hash of the labels of its children nodes; and where "epoch" refers to the beginning of a distinctive period in the history of someone or something." A TOME may use a cryptographic hash function such as SHA256 for the hashing.

In some embodiments, the leaves of the TOME may be specific records and the tree may be defined by the number of data records per the first reference level, the number of segments or time intervals in the first reference level that compose the second reference level, the number segments or time intervals in the second reference level that compose the third reference level, and so on. In some embodiments, the reference levels are defined by time, and in such embodiments, the tree can be defined by the number of data records per second, the number of seconds per minute, the number of minutes per hour, the number of hours per day, etc.

In an example and as further described herein, the Data Storage and Verification Platform can receive data records and provide a timestamp if necessary. Each data record may be hashed with a corresponding timestamp generated by the Data Storage and Verification Platform on reception of the data record. The timestamp can represent varying levels of granularity (e.g., picosecond, second, etc.). In one illustrative example the granularity is represented in seconds, and thus, the hashes for each data record are combined in a temporal/sequential order and a hash of the hashes is generated each second; the combined hash may be referred to as a one-second TOME. Thus, a hash is created for each second. After sixty one-second hashes have been created, all of the one-second hashes are then combined (ascending by time) and hashed to create a one-minute hash, which may be referred to as the one-minute TOME. After sixty of the one-minute hashes have been created, all of the sixty one-minute hashes are ordered (ascending by time) and hashed to create the one-hour TOME. After twenty-four of the one-hour hashes have been created, the twenty-four one-hour hashes are ordered (ascending by time) and hashed to generate the one-day TOME. The day hashes can then be ordered (ascending by time) and hashed to make a one-month TOME (i.e., a hash of thirty or thirty-one daily hashes), a quarterly TOME (i.e., a hash of ninety daily hashes), and/or a yearly TOME (i.e., a hash of 365 daily hashes).

Combining the hashes before a hashing function is performed on the combined hashes can be done using various methods. For example, the hashes can be combined by concatenating the hashes together, by summing the hashes numerically, or by concatenating the binary bytes together. Other methods might also XOR the hashes together, concatenate the hashes with a delimited between them, or add an index number to each hash and then combine the hashes. The method of combining the hashes must be known in order for an independent party to replicate the process and independently arrive at the same result.

There are several types of TOMEs, including a non-sparse TOME, a sparse TOME, and a clockchain TOME. In a non-sparse TOME, hashes for each segment (or unit of time, e.g., one second) are generated regardless of whether data was received during a segment of the first reference level (e.g., a second). Thus, in a non-sparse TOME, there will always be a hash for each segment (i.e., sixty one-second hashes will be created and used to create the one-minute hash even if data was received in only three or four of the sixty one-second hashes).

In a sparse TOME, a hash is created only if data was received during the segment of the first reference level (i.e., if data is received in three seconds out of sixty in a particular minute, only three hashes will be hashed to form the one-minute hash).

A clockchain TOME uses a genesis hash. The genesis hash is the first hash of the epoch and can be a hash of a document that provides a description of the data being hashed or any other type of information. The genesis hash is hashed with the data records in the first segment (e.g., second). In this embodiment, the hash for the first segment (e.g., first second) is hashed with the data records in the next segment (e.g., second second) to create the second segment hash, the second segment hash is hashed with the hash of the data records received during the third segment (e.g., third second), and so on.

The hashes can be recorded in a blockchain at any point, allowing the data to be verified in the future. That is, by reconstructing the TOME with the data, the same hash will be created if the data is undamaged and unaltered. However, if any of the data is changed or if a timestamp in the data has changed, the hash will be different, indicating a difference in the data.

The hashes created using the Data Storage and Verification Platform can be publicly attested to using cryptographic techniques such as public-key cryptography and bidirectional encryption. Public-key cryptography requires a key pair, where the two keys are mathematically linked. One key is a public key that is freely shared among nodes in a peer-to-peer network. The other key is a private key that is not shared with the public. The public key is used to encrypt plaintext and to verify a digital signature. The private key is used to decrypt cipher text and to digitally sign messages. The message may be digitally signed by the sender's private key to authenticate the sender's identity. Then, the sender's digitally signed transaction message may be decrypted using the sender's public key to verify that the sender originated the message.

Benefits of the Data Storage and Verification Platform include transparency and immutability, particularly in time-sensitive data, because the Data Storage and Verification Platform can determine whether data has been altered in the slightest when the data is run through the same algorithm and compared to a stored hash. The Data Storage and Verification Platform provides non-repudiation when hashes of the data are recorded to the blockchain. Once a hash has been recorded in the blockchain, the hashed data cannot be tampered with without invalidating the hash. The Data Storage and Verification Platform provides external attestation by allowing for a digital signature attesting to the validity of the hashed data (e.g., public key cryptography).

Data records may be verified in any time interval (e.g., second, day, week, month, year, decade). The Data Storage and Verification Platform can validate data in smaller time intervals, avoiding the need to verify an entire data set which may span decades. The Data Storage and Verification Platform can validate any type of data or any amount of data. Additionally, storage required for the data record is insignificant. While it is impractical to record each trade on a distributed ledger, hashes at certain points in time (e.g., hourly, daily, weekly, monthly) can be recorded to distributed ledgers (e.g., blockchain for Bitcoin) that are maintained by network nodes.

Time, and specific time increments, are used as examples in the disclosure. However, embodiments of the disclosure can be used with any data and hashed in any time interval.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc-read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 includes applications 105A-105N running on one or more computing devices 110A-110M (such as a mobile device, a mobile phone, a tablet computer, a mobile media device, a mobile gaming device, a vehicle-based computer, a dedicated terminal, a public terminal, a desktop or laptop computer, a smartwatch or other wearable technology, a kiosk, etc.). In some embodiments, applications 105A-105N for carrying out operations such as generating documents or orders may be stored on the computing devices or may be stored remotely. These computing devices can include mechanisms for receiving and sending traffic by connecting through network 115 to the Data Storage and Verification Platform 120.

Computing devices 110A-110M are configured to communicate via network 115 with Data Storage and Verification Platform 120. In some embodiments, computing devices 110A-110M can retrieve information from or submit information to Data Storage and Verification Platform 120 or data store 125 and run one or more applications with customized content retrieved by Data Storage and Verification Platform 120. For example, computing devices 110A-110M each can execute a browser application or a customized client to enable interaction between the computing devices 110A-110M and Data Storage and Verification Platform 120.

Data Storage and Verification Platform 120 can run on one or more servers and can be used to create data records and verify data using hashing techniques, to record hashes to a distributed ledger, to record digital signatures, and to compare hashes, among other activities. Data Storage and Verification Platform 120 may be communicably coupled with data store 125 and computing devices 110A-110M and may communicate, access or receive data (e.g., documents, trade data) from computing devices 110A-110M and data store 125.

Data Storage and Verification Platform 120 may be customized or calibrated by individual companies or service providers based on user needs and/or business objectives. For example, the interval at which the data is hashed may be based on various time intervals in which the data is received (e.g., trade data arrives faster than a second whereas monthly reports generally occur monthly) and thus Data Storage and Verification Platform 120 may be calibrated differently for different uses and different users.

Data Storage and Verification Platform 120 provides, among other things, a method of creating a record of data such that the data can be easily validated at any time in the future. The Data Storage and Verification Platform 120 may create TOMEs in which the leaves of the tree are specific records and the tree is defined by the number of data records per first segmented time period, the number of segments in the first time period that compose the second segmented time period, the number of segments in the second segmented time period that compose the third segmented time period, and so on. For example, the tree may be defined by the number of data records per second, the number of seconds per minute, the number of minutes per hour, the number of hours per day, etc. Data Storage and Verification Platform 120 may record hashes at any point in the tree and then compare that record to hashes of data to verify that the data has not changed.

Data store 125 can be used to manage storage and access to data such as trade data, documents, user information, and other information. Data store 125 may be a data repository of a set of integrated objects that are modeled using classes defined in database schemas. Data store 125 may further include flat files that can store data. Data Storage and Verification Platform 120 and/or other servers may collect and/or access data from the data store 125.

Data Storage and Verification Platform 120 is communicably coupled with one or more distributed ledger(s) 135 through network 130.

Network 115 and network 130 can be the same network or can be separate networks and can be any combination of local area and/or wide area networks, using wired and/or wireless communication systems. Either network 115 or network 130 could be or could use any one or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 and network 130 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 and network 130 may be represented using technologies, languages and/or formats including hypertext markup language (HTML) or extensible markup language (XML). In addition, all or some links can be encrypted using conventional encryption technologies such as secure sockets layer (SSL), transport layer security (TLS), and Internet Protocol security (Ipsec).

Distributed ledger(s) 135 records hashes either automatically (e.g., at the end of a time period) or as requested on a distributed ledger. For example, Bitcoin uses a distributed public ledger called the blockchain. When distributed ledger(s) 135 receives a hash signed with the proper key from Data Storage and Verification Platform 120 and the hash is verified by network nodes, distributed ledger(s) 135 records the hash to the distributed ledger.

Figure 2:
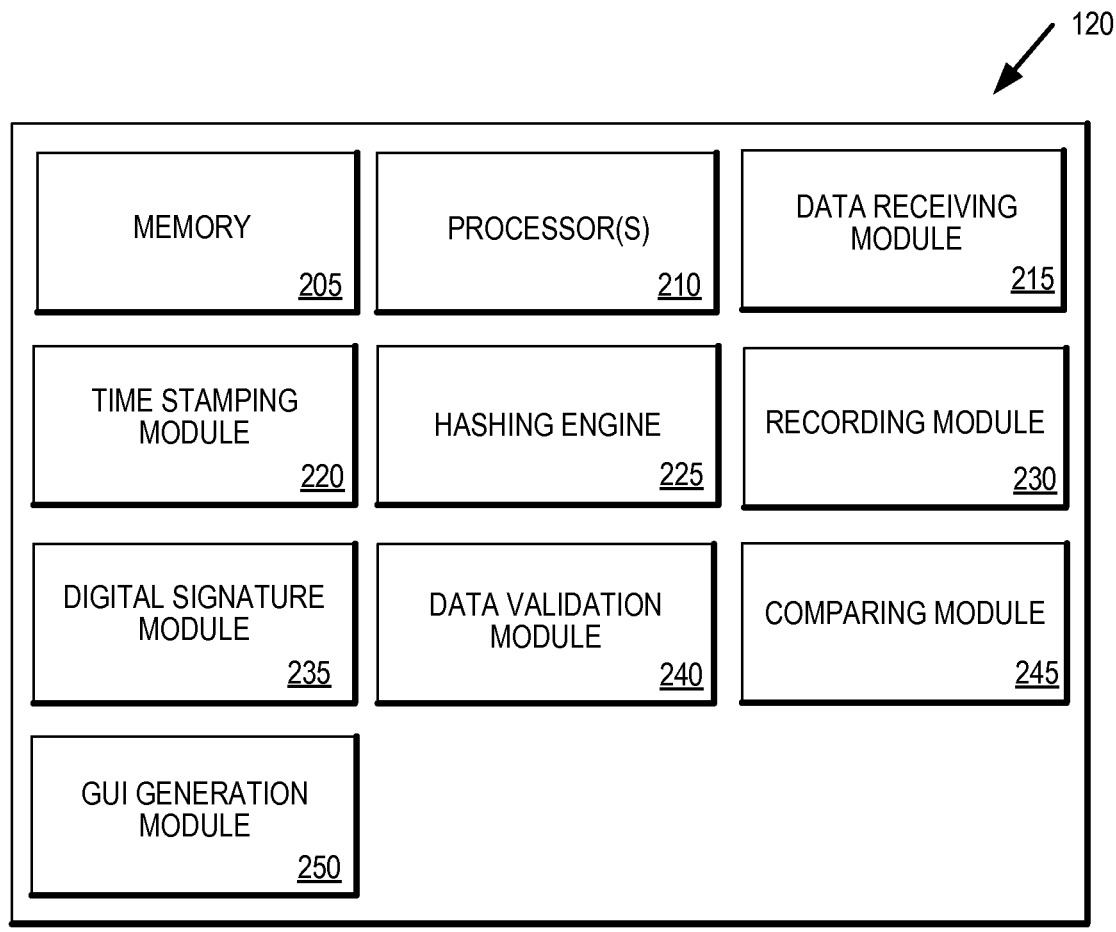
FIG. 2 illustrates a set of components in a data storage and verification platform according to one or more embodiments of the present disclosure.

FIG. 2 illustrates a set of components within Data Storage and Verification Platform 120 according to one or more embodiments of the present disclosure. According to the embodiments shown in FIG. 2, Data Storage and Verification Platform 120 can include memory 205, one or more processor(s) 210, data receiving module 215, time stamping module 220, hashing engine 225, recording module 230, digital signature module 235, data validation module 240, comparing module 245, and Graphical User Interface (GUI) generation module 250. Other embodiments may include some, all, or none of these modules and components along with other modules, applications, and/or components. Still yet, some embodiments may incorporate two or more of these modules and components into a single module and/or may associate a portion of the functionality of one or more of these modules with a different module. For example, in one embodiment, data validation module 240 and comparing module 245 can be combined into a single component.

Memory 205 can be any device, mechanism, or populated data structure used for storing information. In accordance with some embodiments of the present disclosure, memory 205 can be or include, for example, any type of volatile memory, nonvolatile memory, and dynamic memory. For example, memory 205 can be random access memory, memory storage devices, optical memory devices, magnetic media, floppy disks, magnetic tapes, hard drives, erasable programmable read-only memories (EPROMs), electrically erasable programmable read-only memories (EEPROMs), compact discs, DVDs, and/or the like. In accordance with some embodiments, memory 205 may include one or more disk drives or flash drives, one or more tables, one or more files, one or more local cache memories or processor cache memories, one or more relational databases or flat databases, and/or the like. In addition, those of ordinary skill in the art will appreciate many additional devices and techniques for storing information that can be used as memory 205.

Memory 205 may be used to store instructions for running one or more applications or modules on processor(s) 210. For example, memory 205 could be used in one or more embodiments to house all or some of the instructions needed to execute the functionality of data receiving module 215, time stamping module 220, hashing engine 225, recording module 230, digital signature module 235, data validation module 240, comparing module 245, and GUI generation module 250.

Data receiving module 215 can receive data (e.g., data items, data records) into the Data Storage and Verification Platform 120 to create a record of the data using hashing techniques. The data can be any type of data (e.g., document, video, picture, email message), and the data can be received at any interval (e.g., every second, every hour, three times a year, randomly). In some embodiments, the data received by data receiving module 215 can be kept secret but still validated. For example, the data that is sent could be a hash of secret data providing a way for non-repudiation without transparency. In some embodiments, the data received by data receiving module 215 can be the result of an API call (provided that the result of the API call stays consistent for validation of third-party data).

Data receiving module 215 can also receive verification data for the purpose of verifying that the verification data is the same as the data that was initially received. That is, a record of verification data may be made using the same hashing techniques to determine whether it is the same as the initial data. Such verification may be helpful in verifying data transferred from peer to peer networks, to detect fake data, or to comply with an audit. Data or data items received via data receiving module 215 may be communicated to time stamping module 220 for time stamping, if needed, or directly to hashing engine 225 for hashing if time stamping is unnecessary.

Time stamping module 220 can determine whether a timestamp is needed and then time stamp the data as needed. Some data may already include a timestamp, which may be helpful for time-sensitive data. In some embodiments, the data is timestamped regardless of whether the data already includes a timestamp. The data can be timestamped at any granularity (e.g., picoseconds, milliseconds, microseconds, nanoseconds, seconds, minutes, hours). The timestamp can be the beginning of the epoch or a real timestamp of the data record. The epoch value passed is the number of seconds encompassed in the epoch. The time can be specified in any manner specific enough to denote a moment in time (worldwide) (e.g., Julian, data string with a time zone such as GMT). The data, with a timestamp, is sent to hashing engine 225.

Hashing engine 225 receives data and hashes the data with its timestamp at its time-stamped record level. Then the hashes for each record are combined in time order. Sometimes, the time resolution is not granular enough to put the records in a deterministic order (i.e., two data records are received at the same time or are recorded with the same time stamp). During such circumstances, the hash of the data records can be used for a secondary sort order because during verification, the hash of the verification data will result in the same hash as the original data (if the data is the same), which can be sorted. Thus, in some embodiments, the data is sorted by time first, then, if there is a tie, the data is sorted by the hashes of the data. Sorting in this manner allows a third party or a different compatible system a method of ordering the data in a consistent manner.

Each reference level may have a number of sequenced segments, each of which are hashed to create a single hash for the reference level, which is then used in generating the next reference level. As an example, assume that seconds are the first reference level, minutes are the second reference level, and hours are the third reference level. The first reference level includes 60 sequenced segments (i.e., 60 seconds), the hashes of which will be used as a segment of the second reference level. As the data is received, the data is hashed, and all the data received during a particular segment (i.e., second) is hashed. Then the hashed data for each segment (i.e., 60 hashes) is hashed together in an ascending order to generate one segment on the second reference level (i.e., 60 one-second hashes are hashed to generate a one-minute hash). The second reference level includes 60 segments (i.e., 60 minutes). Thus, 60 sequenced segments from the second reference level are hashed together in an ascending order to generate one segment on the third reference level (i.e., 60 one-minute hashes are hashed to create a one-hour hash). The third reference level includes 24 segments which are hashed together in an ascending order to generate one segment on the fourth level (i.e., 24 one-hour hashes are hashed to create a one-day hash). This process can continue such that one hash is representative of weeks, months, quarters, years, decades of data, or any other time period.

Each hashed segment of the record data at each reference level may be labeled as a hashed segment for the reference level, or a TOME. Thus, if the first reference level is a second, the hash for each second is a hashed segment for the second reference level. If the second reference level is a minute, the hash of sixty of the hashed second segments is one hashed segment for the minute reference level. If the third reference level is an hour, then the hash of sixty of the hashed minute segments is one hashed segment for the hour reference level.

When data is received, the data is timestamped and hashed with the timestamp. Then all of the data that is received within the first second is hashed together, in a time-sequenced manner. The same process occurs for the second second, the third second, and so on until the end of the segments in that reference level.

Hashing engine 225 can use slightly varied hashing algorithms. For example, in a "sparse TOME," when data is not received during any period of time, no hash is created or stored for that time period. Thus, it is possible that there is no hash for a particular second, minute, hour, or week. In a sparse TOME, if data at a time period in which no data was received is asked to be validated, it will return null, 0, or nothing for the hash. For example, in a sparse TOME that has only one data point in a year, there would be data for that second, minute, hour, day, week, month, and year, but nothing else (e.g., sha256(sha256(sha256(sha256(sha256(one_data_point))))))).

Hashing engine 225 can also use a "non-sparse TOME" algorithm. In a non-sparse TOME algorithm, if there is no data at any point in time, hashing engine 225 still creates a hash. Assuming seconds is the lowest reference level, if no data is received during a second, a hash is created for the second (e.g., a hash of an empty string). For example, the static SHA256 hash of the empty string can be used. In a non-sparse TOME, there will always be 60 one-second hashes to generate the one-minute hash.

There are advantages to using the sparse TOME over non-sparse TOME and vice versa. For example, the non-sparse TOME provides a data point confirming that no data was received during the time period, whereas there is no specific confirmation except a lack of data when using the sparse TOME. On the other hand, because the non-sparse TOME provides a hash regardless of whether data is received, the hash file for a non-sparse TOME will be larger than the hash file of a sparse TOME when data is not received during every segment of the first reference level.

Generally, data storage for the hashes is not substantial. For example, storage for an entire year of non-sparse TOME data may be roughly two gigabytes of data, assuming that the reference levels include seconds, minutes, hours, weeks, months, and years; that the hashes are SHA256; that the binary hashes are stored as 32-byte hashes; and that the concatenated hashes are stored as 64-hex characters. Storage numbers may increase or decrease depending on how much data is received and hashed for a given second (e.g., the hex string that is hashed for a particular second may be larger or smaller, depending on the number of data items received during the second). In a non-sparse TOME, the minute hash will always be a 3840 (i.e., 64*60) character string of hex values where a weekly hash is a 448 (i.e., 64*7) character string of hex values of the daily hashes.

Hashing engine 225 can also use a "clockchain TOME." The clockchain TOME is a non-sparse TOME in that there are hashes for each segment of the lowest reference (e.g., each second) regardless of whether data is received for the segment. The clockchain TOME is unique from the non-sparse TOME in that it takes the hash from a previous segment of the first reference level, uses the hash from the previous segment as the first hash for the current segment, and hashes the hash from the previous segment with the other data hashes received for the current segment, in ascending order. The hash of the current segment is then used as the first hash for the following segment.

The very first hash of the very first segment of the TOME may be called a genesis hash as it is a hash of the genesis meta-data. The genesis meta-data may define terms relating to the TOME data and/provide the reasoning for the TOME's existence (e.g., document specifying legal definition of an asset being traded and the original quantity, customer number, generation of broker-dealer), whereas the TOME data is the hashes of the actual data (e.g., trade data for the asset). Thus, the genesis hash and all the data hashes received during the first second are hashed to form the first second hash, the first second hash is hashed with all the data hashes received during the second second to form the second data hash, the second data hash is hashed with all the data hashes received during the third second, and so on. The clockchain essentially has a birthday and tracks every data point for every second, beginning with the birthday of the clockchain tree. Additionally, during validation, the clockchain TOME will validate (and is required to validate) every hash going backwards to the beginning of the tree. Thus, the clockchain could validate every trade from the beginning of a stock's issuance.

Hashing engine 225 may create the hashes using SHA256, and may represent the hashes using 64 hex characters. Storage may be optimized by storing the 32-byte binary hashes, but the concatenated hashes to be hashed can be the 64 hex characters.

Recording module 230 records one or more of the hashes (TOMEs) into a medium such as a blockchain. Any blockchain can be used to record one or more TOMEs. Recording module 230 can record the TOMEs at any time interval that a commit occurs (e.g., every minute, every hour by combining the minute hashes). A commit is made specifying the end of an epoch boundary (e.g., end of a second, end of a minute) and locks the data so no more data may be added once committed. Then recording module 230 combines all the hashes up to the epoch boundary. If the commit occurs on a timestamp that is not a boundary (e.g., 1.5 seconds), then the last boundary going backwards may be used (e.g., 1 second).

The time interval for recording the TOMEs may depend on the speed of the blockchain. For example, some blockchains may record hour hashes into a ten-minute blockchain, such as Bitcoin, or minute hashes every minute in a 30-second blockchain such as Inifinitecoin. In some embodiments, the TOMEs are automatically recorded in the blockchain at certain intervals. For example, the hourly or daily times that encompass the entire data for that epoch may be recorded. Thus, recording module 230 records the hash to transparently and permanently record proof of existence of the data for any chosen block of time.

In some embodiments, after the data is recorded through a certain epoch (e.g., a day), no changes may be made to any of the TOMEs included in that day (e.g., daily). Other mediums besides blockchains can be used to record the hashes such as a newspaper, website blog, twitter, etc.

Digital signature module 235 can allow multiple entities to sign (i.e., attest to) the data at any time level. Attestations could occur daily, monthly, weekly, and/or yearly. To attest to the data, public key cryptography can be used such that an ATS or broker-dealer can digitally sign a hash, publicly stating that the hash of the data is authentic and represents the actual data. Additionally, digital signatures could be affixed automatically by the devices that independently audit the data and verify the hashes. In some embodiments, each data entry may be digitally signed. In an example, a hash of the data is played through two systems and thereafter the hashes for the day are compared. If the hashes are the same, then a digital signature can be applied to the hash validating the data for the day. In some embodiments, hashes are digitally signed before being recorded on the blockchain. The signature of a hash represents that all time-ordered data that occurred during that epoch is valid. Thus, a signature of a hash for a week of data attests that the data for the entire week is valid.

Data validation module 240 validates verification data (i.e., determines whether the data has changed since the original data was hashed) by receiving a TOME at a point in time and running the potentially suspect verification data through the same hashing algorithm. The verification data would include the data from the same time range as the initial data. Assuming that the same hashing algorithm or function with the same specifications (e.g., how time records are specified, the precisions of real numbers, data format (e.g., JSON, XML, Binary)) is used, the same hashes should be replicated for each data record, resulting in the same TOMEs. Because the timestamp is recorded in the record, the Merkle Tree hashes for the second, minute, day, hour, etc. can also be replicated. Data validation module 240 can validate any type of data. Thus, data validation module 240 can verify and guarantee that data has not been added, removed, or tampered with for any epoch (i.e., time range). In some embodiments, data validation module 240 performs a verification of data upon a triggering event. Triggering events may include an audit event required by a regulator or other entity requesting a data integrity check. Data validation module 240 may be used to compare one system with another system that was running in parallel.

The amount of data required for the validation depends on the type of algorithm used to create the hashes and the timeframe of the data for validation. For example, to validate data hashed using the clockchain algorithm, data validation module 240 must validate the entire timeframe requested for validation, beginning at the genesis meta-data. Thus, the user must provide the genesis meta-data, as well as all the data leading up until the point of time that the user is interested in validating. For every validation that is performed, by design, data validation module 240 validates every hash going backwards to the beginning of the tree when the clockchain algorithm began. In contrast, when using a non-sparse TOME or a sparse TOME, the user can specify a subset of data to validate. Since there is no particular genesis meta-data or birthday for the non-sparse TOME or the sparse TOME, it is not necessary to start at a particular point in time. For example, if the user wants to validate a particular hour of data, then the data for that entire hour is all that is necessary. Data validation module 240 takes the data for the hour and recreates the hashes for the hour. Similarly, if the user wants to validate a year of data, only the data for that entire year is necessary.

Comparing module 245 compares the original hash with the hash of the verification data created by data validation module 240. If the hashes are different, something in the data was changed. Any change in the data, including a change of a timestamp, a change to the data, or a re-ordering of data, will produce a different hash. For example, if the data is a movie and one pixel of the movie is changed, the hash will be different. In another example, if the data is trade data and a timestamp of one trade out of millions of trades has been altered, the hash will be different.

If the hash is different, then something in the data changed. To determine precisely where the data was altered, a smaller amount of time may be examined. For example, in a non-sparse TOME or a sparse TOME, if a month of data was validated and the validation failed, then each of the weeks of that month of data could be validated to determine which week failed. Once a failed week is determined, each day in the failed week could be validated to identify which day failed. Once the failed day is identified, each hour could be validated to determine which hour failed. This process can be iteratively continued until the exact data hash that failed is identified. If the algorithm is a clockchain, then identifying the exact data that has changed will be a slightly different process because all the data from the genesis up to the point of validation has to be included. Assuming that a month of data failed to validate, all the data from the genesis to the end of the month, and the data from the genesis to the middle of the month, could be validated to determine whether the data changed during the first half of the month or the second half of the month. Once it is determined which half of the month contained the altered data, then the next iteration can validate up to the first week of the month (if the first two weeks contained the bad data) or the third week of the month (if the last two weeks contained the bad data). An iterative process as described can be performed until the exact data record is identified.

By validating the order of events, no re-ordering of events can occur without invalidating the verification data. The comparison data may be provided to auditors to prove that the data has not changed. Thus, the high-speed and high-volume nature of modern data flows can be matched with the traditional auditing intervals of monthly, quarterly, or yearly, as required by regulations.

GUI generation module 250 can generate one or more GUI screens that allow interaction with a user. In at least one embodiment, GUI generation module 250 generates a graphical user interface receiving and/or conveying information to the user. For example, GUI generation module 250 may display a user interface in which the user can request timeframes of data to be validated and specify the type of algorithm used. GUI generation module 250 can also display the validation results.

Figure 3:
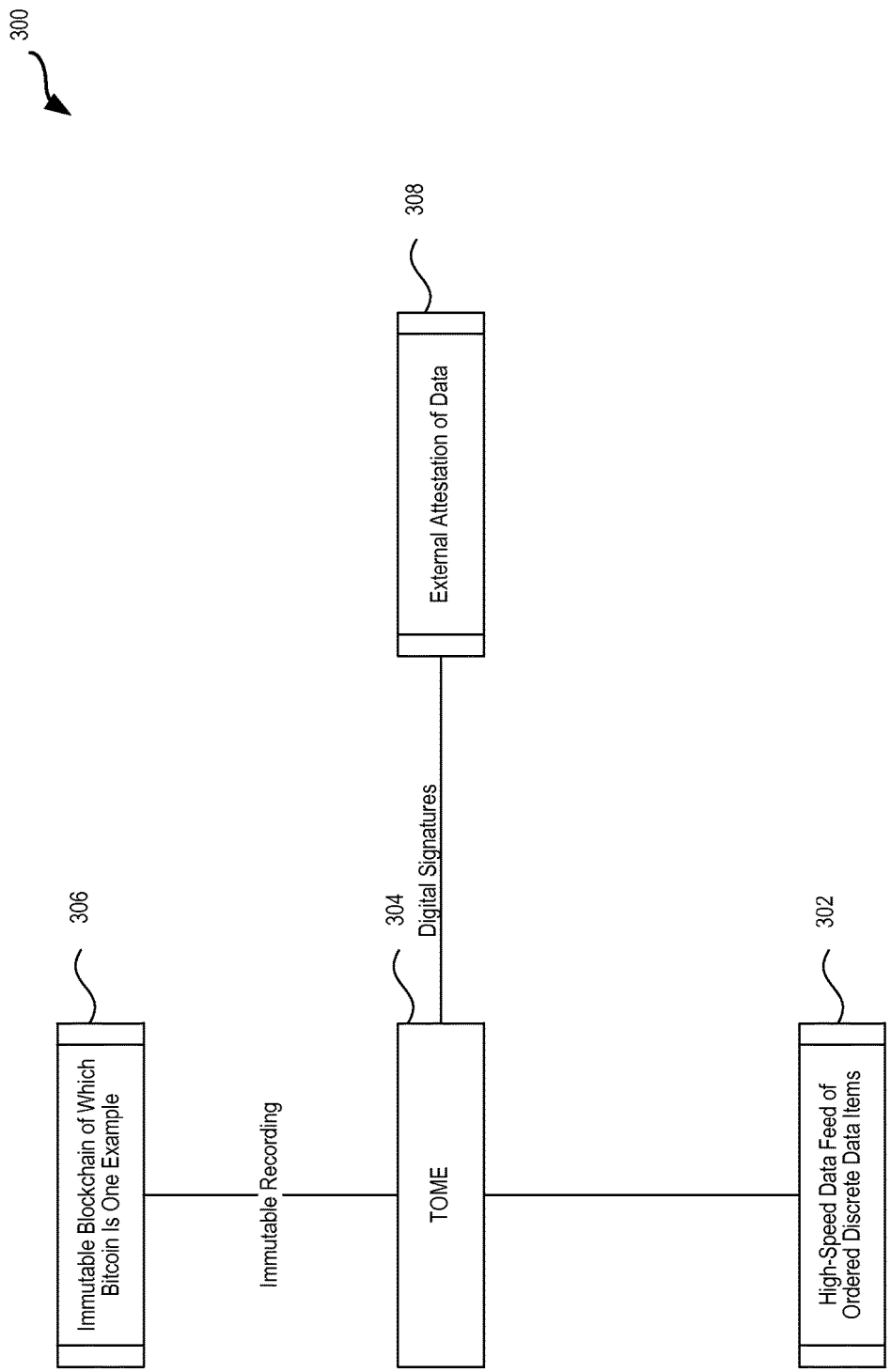
FIG. 3 is a diagram illustrating an architecture of a data storage and verification platform according to one or more embodiments of the present disclosure.

FIG. 3 is a diagram 300 illustrating interaction of components used in a data storage and verification platform. As shown in FIG. 3, Data Feed 302 receives high-speed data of ordered discrete data items. TOME 304 generates TOMEs of the high-speed data by hashing the data items in a sequenced manner using reference levels. Recorder 306 records hashes of the data items at any point in time on a blockchain such that the a record of the hash is memorialized. Thus, data can be verified as being unchanged by later by reconstructing the recorded hash with the data and verifying that the recorded hash and the reconstructed hash are the same. Attestation unit 308 receives digital signatures verifying that data and/or hashes are accurate (i.e., the data is uncompromised). The attestations may be used later as further proof that the initial data was the correct data.

Figure 4:
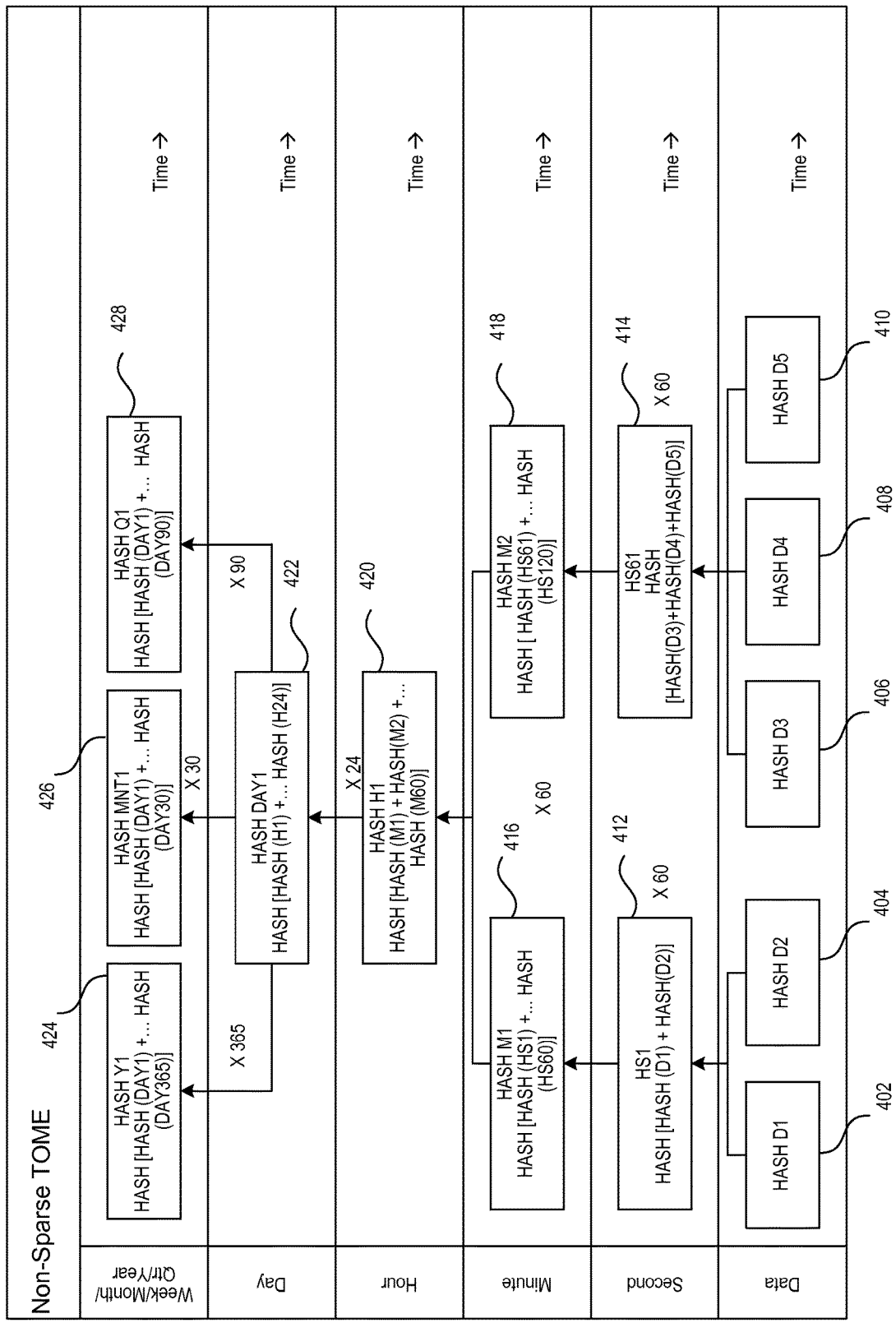
FIG. 4 illustrates a process of storing and verifying data using a non-sparse TOME according to one or more embodiments of the present disclosure.

FIG. 4 illustrates a process of storing and verifying data using a non-sparse TOME. As shown, data items 402, 404, 406, 408, and 410 are received, and each data item is timestamped and hashed. As noted above, in a non-sparse TOME, even if no data is received during a second, a hash will be created specifying that there was no data during the second. Next, the hashes of the data items for each second are hashed together, sequentially. For example, data items 402 and 404 are received during the first second; thus, the hashes of data items 402 and 404 are hashed together to create the hash of the first second of the first set of second hashes, element 412. FIG. 4 shows only two data items occurring during the first second; however, fewer or more data items could be received, and each will be individually hashed and subsequently hashed with the other hashes of the data items. This process is repeated for the following 59 seconds such that there are 60 hashes representing all the data items received during each second.

Thereafter, the 60 hashes (one for each second) are hashed together to create the first minute hash, element 416. When a leap-second is applicable, 61 second hashes may be hashed together to create a minute hash. This process is repeated for 60 minutes such that at the end of 60 minutes there are 60 hashes representing all the data received during each of the minutes. As shown, data items 406, 408, and 410 are hashed during a second set of seconds (e.g., seconds 61-120). Then the hashes of the data items 406, 408, and 410 are hashed in element 414 to generate the first of the second set of second hashes. Once hashes for all 60 seconds (e.g., seconds 61-120) are created, a second minute hash, element 418, is created by hashing all 60 of the second hashes.

Next, elements 416 and 418, each hashes of a minute of data, are hashed together with 58 other hashes of a minute of data to generate a first hour hash, element 420 (i.e., 60 minutes of hashed data). This process is repeated twenty-three times such that there are a total of 24 hour hashes. Each of the 24 hour hashes are hashed together to create a first day hash, element 422. Day hashes can be created and hashed together in any desirable increment. For example, 365 day hashes can be hashed to generate a hash for an entire year of data, element 424. While 365 day hashes are shown in the element 424, it is understood that the number of days could be 365 or 366, depending on the number of days in the particular year. Or, 30 day hashes can be hashed to generate a hash for a month, element 426. While 30 day hashes is shown in element 426, the number days could be 28-31, depending on the number of days in a particular month. In some embodiments, instead of hashing 365 day hashes, twelve month hashes can be hashed together to create a year hash. Additionally, 90 day hashes (or 91 or 92 day hashes, as applicable for the quarter) can be combined to create a hash for a quarter, element 428.

Figure 5:
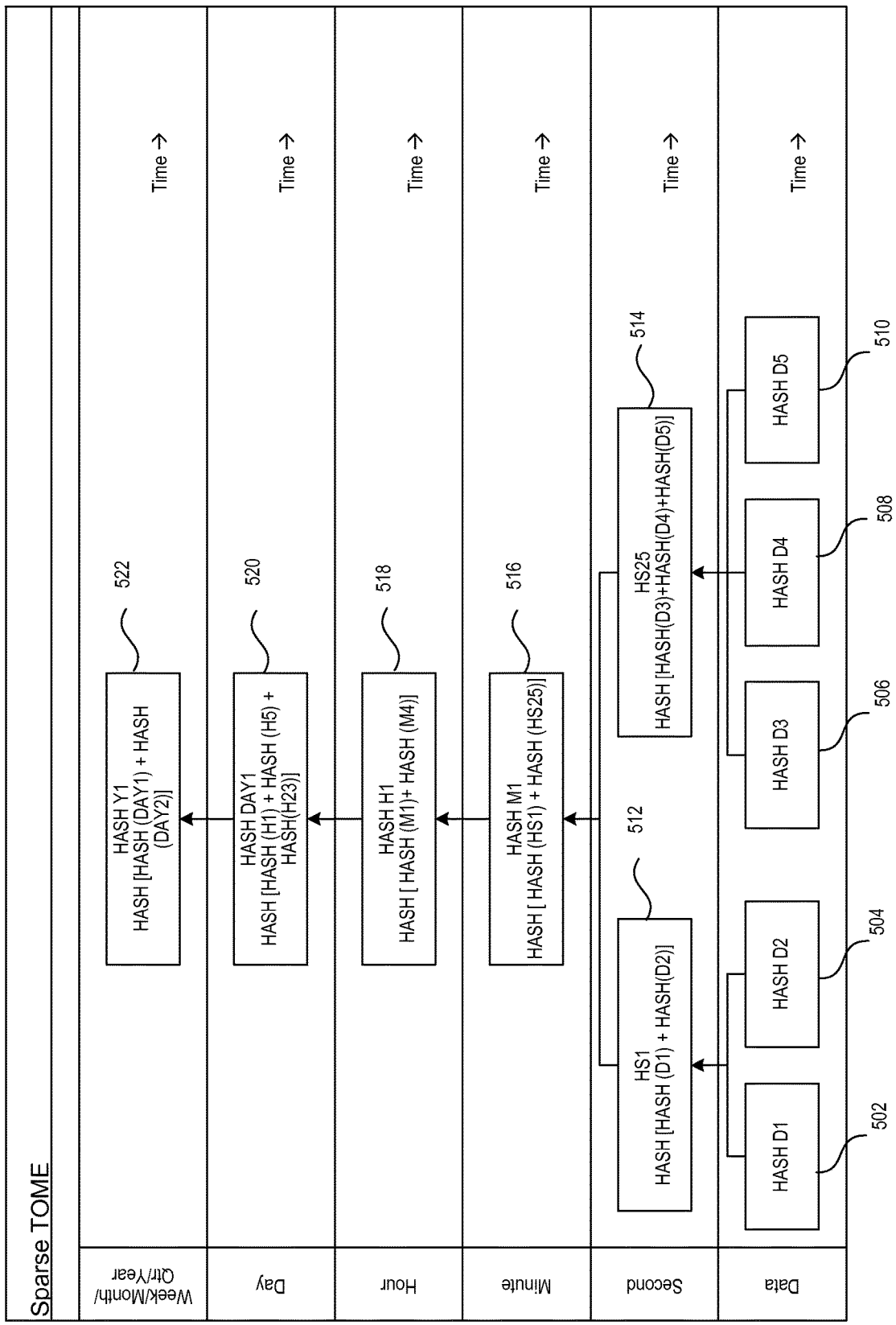
FIG. 5 illustrates a process of storing and verifying data using a sparse TOME according to one or more embodiments of the present disclosure.

FIG. 5 illustrates a process of storing and verifying data using a sparse TOME. The sparse TOME works in the same way as the non-sparse TOME except that when data is not received during a time period, a hash is not created. Thus, in a sparse TOME, there may be many missing hashes, depending on how fast the data is being received. As shown, data is received during the first second (data items 502 and 504) and the twenty-fifth second (data items 506, 508, and 510). The data hashes for the first second, element 512, and for the twenty-fifth second, element 514, are each hashed, and the hash of the first second is hashed with the twenty-fifth second to generate the first minute hash, element 516. Since no data items were received during seconds 2-24 or 26-60, no additional hashes are created. In contrast, in a non-sparse TOME, regardless of whether data was received during a second, the system generates a hash such that there will always be 60 hashes to be hashed to generate the minute hash.

The hour hash is then created, element 518, by hashing the minute hashes. In this example, there are minute hashes available for the first minute (M1) and the fourth minute (M4), meaning that at least some data was received during the first minute and the fourth minute. Next, a day hash is created by hashing the hash of each hour in which data was received. Here, the day hash, element 520, includes a hash of the first hour, a hash of the fifth hour, and a hash of the twenty-third hour. A hash of the data for the year can be generated by hashing the hashes of the available days (e.g., the first day and the second day), element 522.

Figure 6:
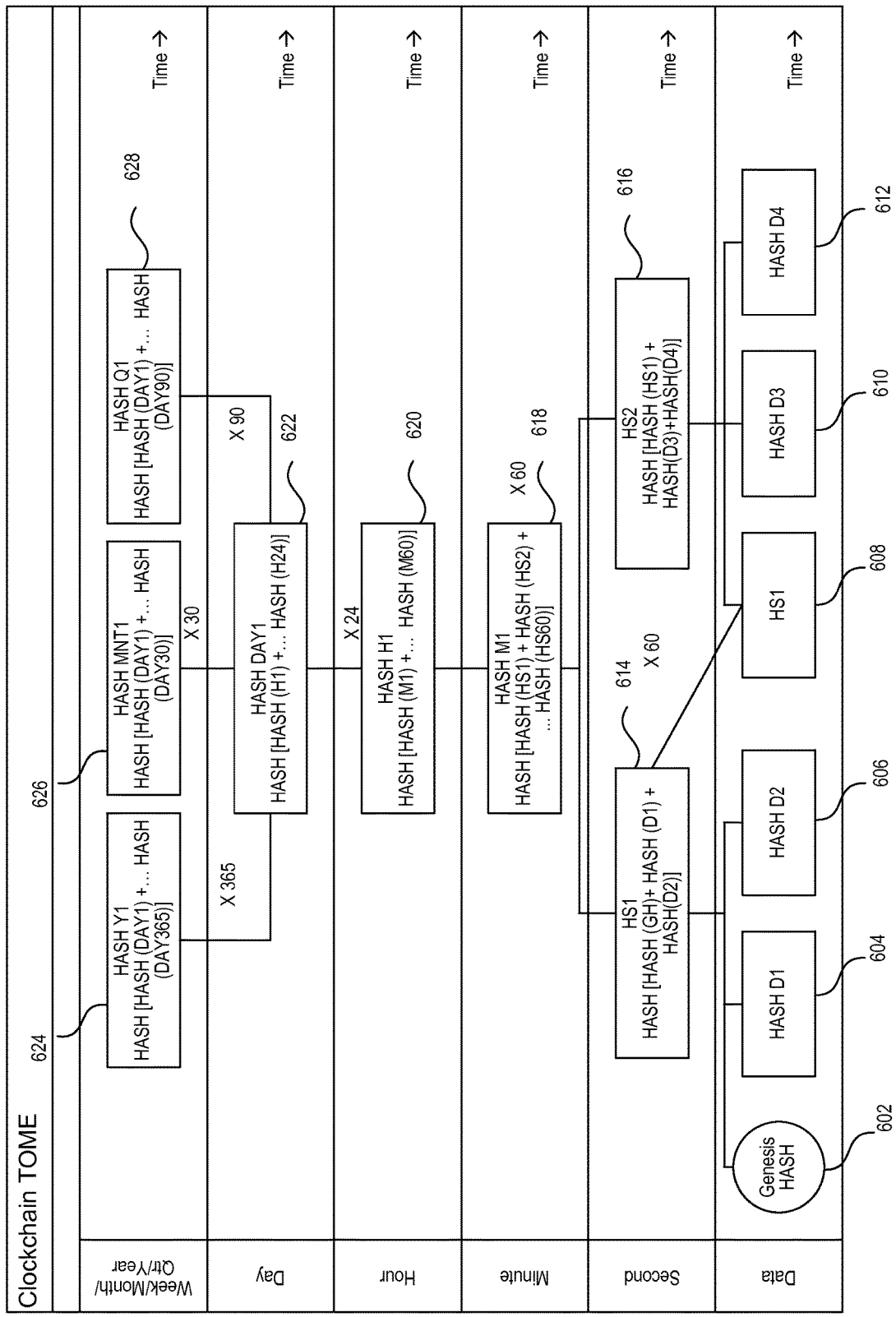
FIG. 6 illustrates a process of storing and verifying data using a clockchain TOME according to one or more embodiments of the present disclosure.

FIG. 6 illustrates a process of storing and verifying data using a clockchain TOME. The clockchain TOME operates identically to the non-sparse TOME with the exception of two features. First, every clockchain TOME begins with a genesis hash, element 602. The genesis hash could be any type of data, preferably data that explains what data is included in the TOME (e.g., stock identifier, customer number). The genesis hash and the hashes of data items 604 and 606 are hashed together to generate the first second hash, element 614.

The second difference from the non-sparse TOME is that the second second hash begins with the first second hash, element 608. Thus, the second second hash, element 616, is a hash of the first second hash, element 608, and hashes of data items 610 and 612. This process is repeated for each second. For example, the second second hash would be the first hash of the third second hash. Once the first sixty seconds of hashes are complete, the hashes for each of the sixty seconds (or 61 seconds when there is a leap second) are hashed to create the first minute hash, element 618. Then the data received in the following sixty seconds is hashed in the same manner to create the second minute hash. This process is repeated for each of the following minutes for a total of sixty minutes. The sixty minute hashes are hashed to create an hour hash, element 620. Elements 622, 624, 626, and 628 are created in the same manner described for elements 422, 424, 426, and 428, respectively.

Various embodiments of the present disclosure are described below.

1. A computerized method comprising:
   receiving data items during first reference level segments of a first reference level;
   performing a hashing function on each of the data items with a corresponding timestamp;
   generating a first reference level segment hash for each of the first reference level segments by performing a second hashing function on the hashes of the data items in each of the first reference level segments according to their respective timestamps; and
   generating a second reference level segment hash for each of multiple second reference level segments, wherein the each of the multiple second reference level segments is comprised of a predetermined number of the first reference level segments, wherein the each of the multiple second reference level segment hashes are generated by performing a third hashing function on the predetermined number of the first reference level segment hashes.

2. The computerized method of claim 1, further comprising recording at least one of the second reference level segment hashes to a distributed ledger.

3. The computerized method of claim 1 or 2, wherein the first reference level segments and the second reference level segments are periods of time.

4. The computerized method of claim 3, wherein the period of time of the first reference level segment is a second, and wherein the period of time of the second reference level segment is a minute.

5. The computerized method of claim 4, wherein the predetermined number of the first reference level segments is sixty or sixty-one.

6. The computerized method of claim 1, 2, 3, or 4, further comprising generating reference level segment hashes for additional reference levels, wherein each of the additional reference levels comprises multiple reference level segments, wherein each of the multiple reference level segments comprises a predetermined number of previous reference level segments, wherein generating each of the additional reference level segment hashes comprises performing an additional hashing function on the additional reference level segment hashes of each of the predetermined number of the previous reference level segments.

7. The computerized method of claim 6, wherein a first received data item includes genesis data, wherein a first hash of each of the first reference level segments is a hash of an immediately previous first reference level segment except for a first hash of a first segment of the first reference level, wherein a first hash for each of the additional reference level segments is a hash of an immediately previous additional reference level segment except for a first hash of a first additional reference level segment of each of the additional reference levels.

8. The computerized method of claim 1, 2, 3, 4, 5, or 6, wherein generating a first reference level segment hash for each of the first reference level segments is performed regardless of whether any of the data items are received during the time interval, wherein when no data items are received during one of the first reference level segments, a placeholder first reference level segment hash is performed.

9. A non-transitory computer-readable storage medium including a set of instructions that, when executed by one or more processors, cause a machine to:
   generate reference levels according to time intervals, wherein the first reference level comprises a predetermined number of the time intervals, wherein each of the time intervals of the remaining reference levels is comprised of a predetermined number of the time intervals of a previous reference level;

create hashes of data at the first reference level by performing a hashing function on the data according to the time interval in which the data is received;

generate first reference level time interval hashes by performing the hashing function on the hashes of the data at each of the time intervals of the first reference level up to the predetermined number of the time intervals of the first reference level; and generate reference level time interval hashes for the remaining reference levels by performing the hashing function on the hashes of the each of the time intervals of the previous reference level up to the predetermined number of the time intervals.

10. The non-transitory computer-readable storage medium of claim 9, wherein the set of instructions, when executed by the one or more processors, further cause the machine to record at least one of the reference level time interval hashes to a distributed ledger.

11. The non-transitory computer-readable storage medium of claim 10, wherein the set of instructions, when executed by the one or more processors, further cause the machine to:

process received verification data spanning a time period of the at least one of the reference level time interval hashes;

generate the reference level time interval hashes for the verification data; and compare the reference level time interval hash for the verification data with the at least one of the reference level hashes to verify that the verification data is unchanged from the data.

12. The non-transitory computer-readable storage medium of claim 9, 10, or 11, wherein the time interval of the first reference level is seconds, and wherein the predetermined number of the time intervals in the first reference level is sixty or sixty-one.

13. The non-transitory computer-readable storage medium of claim 12, wherein the remaining reference levels comprise a second reference level, wherein the time interval of the second reference level is minutes, wherein the predetermined number of the time intervals in the second reference level is sixty.

14. The non-transitory computer-readable storage medium of claim 13, wherein the remaining reference levels further comprise a third reference level, wherein the time interval of the third reference level is hours, wherein the predetermined number of the time intervals in the third reference level is twenty-four.

15. The non-transitory computer-readable storage medium of claim 10, 11, 12, 13, or 14, wherein the set of instructions, when executed by the one or more processors, further cause the machine to:

receive a cryptographic signature attesting to the data; and record at least one of the additional reference level time interval hashes to a distributed ledger.

16. The non-transitory computer-readable storage medium of claim 9, 10, 11, 12, 13, 14, or 15, wherein the set of instructions, when executed by the one or more processors, further cause the machine to timestamp the data, wherein creating hashes of data by performing the hashing function on the data at the first reference level includes performing the hashing function on the data with the timestamp.

17. The non-transitory computer-readable storage medium of claim 9, 10, 11, 12, 13, 14, 15, or 16 wherein a first received data of the data includes genesis data, wherein a first hash of each of the time intervals of the first reference level is a hash of an immediately previous time interval except for a first hash of a first time interval of the first reference level time interval, wherein a first hash of each of the time intervals of each of the remaining reference levels is a hash of an immediately previous time interval except for a first hash of a first reference level time interval of the each of the remaining reference levels.

18. The non-transitory computer-readable storage medium of claim 9, 10, 11, 12, 13, 14, 15, 16, or 17, wherein the first reference level time interval hashes are performed regardless of whether the data was received during the time interval, wherein when no data is received during the time interval, a placeholder first reference level time interval hash is performed.

19. A data storage and verification platform, comprising:

one or more processors; and a computer readable storage medium having instructions stored thereon, which when executed by the one or more processors cause the data storage and verification platform to:

generate reference levels according to time intervals, wherein the first reference level comprises a predetermined number of the time intervals, wherein each of the time intervals of the remaining reference levels is comprised of a predetermined number of the time intervals of a previous reference level;

create hashes of data at the first reference level by performing a hashing function on the data according to the time interval in which the data is received, wherein the data is hashed in an order it was received;

generate first reference level time interval hashes by combining the hashes of each of the data received during each of the time intervals in a temporal order and performing the hashing function on the combined hashes of the data at each of the time intervals of the first reference level up to the predetermined number of the time intervals of the first reference level, wherein when the data is not received during any one of the time intervals of the first reference level, a placeholder hash for a first reference level time interval hash is generated; and generate reference level time interval hashes for the remaining reference levels by combining the hashes of each of the time intervals of the previous reference level up to the predetermined number of the time intervals in a temporal order and performing the hashing function on the combined hashes of the each of the time intervals of the previous reference level up to the predetermined number of the time intervals.

20. The data storage and verification platform of claim 19, wherein a first received data of the data includes genesis data, wherein a first hash of each of the time intervals of the first reference level is a hash of an immediately previous time interval except for a first hash of a first time interval of the first reference level time interval, wherein a first hash of each of the time intervals of each of the remaining reference levels is a hash of an immediately previous time interval except for a first hash of a first reference level time interval of the each of the remaining reference levels.

21. The data storage and verification platform of claim 19 or 20, wherein combining the hashes of each of the data received during each of the time intervals in a temporal order comprises concatenating the hashes of the each of the data.

Computer System Overview

Figure 7:
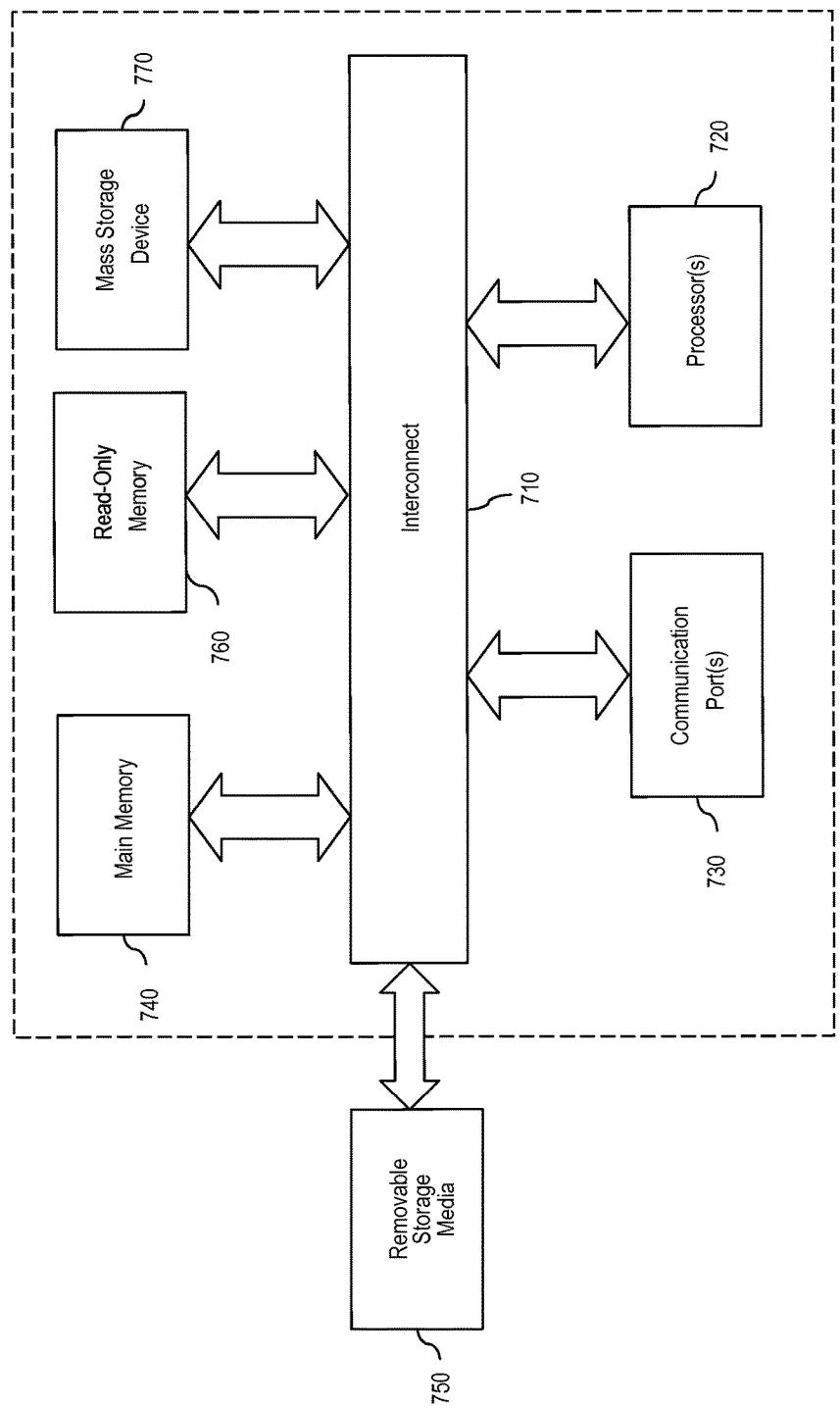
FIG. 7 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present disclosure may be utilized. According to the present example, the computer system 700 includes an interconnect 710, at least one processor 720, at least one communication port 730, a main memory 740, a removable storage media 750, a read-only memory 760, and a mass storage device 770.

Processor(s) 720 can be any known processor. Communication port(s) 730 can be or include, for example, any of an RS-232 port for use with a modem-based dialup connection, a 10/100 Ethernet port, or a Gigabit port using copper or fiber. The nature of communication port(s) 730 may be chosen depending on a network such as a Local Area Network (LAN), Wide Area Network (WAN), or any network to which the computer system 700 connects.

Main memory 740 can be Random Access Memory (RAM), or any other dynamic storage device(s) commonly known in the art. Read-only memory 760 can be any static storage device(s) such as Programmable Read-Only Memory (PROM) chips for storing static information such as instructions for processor 720.

Mass storage device 770 can be used to store information and instructions. For example, hard disks such as the Adaptec® family of SCSI drives, an optical disc, an array of disks, such as the Adaptec family of RAID drives, or any other mass storage devices may be used.

Interconnect 710 can be or include one or more buses, bridges, controllers, adapters, and/or point-to-point connections. Interconnect 710 communicatively couples processor(s) 720 with the other memory, storage, and communication blocks. Interconnect 710 can be a PCI/PCI-X-based or an SCSI-based system bus, depending on the storage devices used.

Removable storage media 750 can be any kind of external hard drives, floppy drives, compact disc-read-only memory (CD-ROM), compact disc-rewritable (CD-RW), or digital video disc-read-only memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure, and may be included in more than one embodiment of the present disclosure. In addition, such phrases do not necessarily refer to the same embodiment or different embodiments.

If the specification states that a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure provides novel systems, methods, and arrangements for storing and verifying data. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A computerized method comprising:
receiving data items during a plurality of first reference level time intervals of a first reference level;
generating a genesis hash of genesis data by performing a first genesis hashing function on the genesis data;
generating a hash for each of the data items in the order in which the data items are received by performing a first hashing function on each of the data items with a corresponding timestamp;
generating an initial first reference level time interval hash of a plurality of first reference level time interval hashes for an initial first reference level time interval of the plurality of first reference level time intervals by performing an initial second hashing function using the genesis hash and the hash for each of the data items in the initial first reference level time interval according to respective timestamps of each of the data items;
generating a first reference level time interval hash for each of the first reference level time intervals other than the initial first reference level time interval, wherein each respective first reference level time interval hash is generated by performing a second hashing function using a first reference level time interval hash of a first reference level time interval immediately preceding the respective first reference level time interval and the hashes of the data items in the respective first reference level time interval according to respective timestamps of each of the data items;
generating an initial second reference level time interval hash of a plurality of second reference level time interval hashes for an initial second reference level time interval of the plurality of second reference level time intervals by performing an initial third hashing function using the initial first reference level time interval hash and the first reference level time interval hash for each of a predetermined number of the first reference level time intervals;
generating a second reference level time interval hash for each of multiple second reference level time intervals other than the initial second reference level time interval, wherein each of the multiple second reference level time intervals is comprised of a predetermined number of the first reference level time intervals, wherein each respective second reference level time interval hash of the multiple second reference level time interval hashes is generated by performing a third hashing function using the first reference level time interval hashes for the first reference level time intervals within the respective second reference level time interval;
generating an initial third reference level time interval hash of a plurality of third reference level time interval hashes for an initial third reference level time interval of the plurality of third reference level time intervals by performing an initial fourth hashing function using the initial second reference level time interval hash and the second reference level time interval hash for each of a predetermined number of the first reference level time intervals; and
generating a third reference level time interval hash for each of multiple third reference level time intervals other than the initial third reference level time interval, wherein each of the multiple third reference level time intervals is comprised of a predetermined number of the second reference level time intervals, wherein each respective third reference level time interval hash of the multiple third reference level time interval hashes is generated by performing a fourth hashing function using the second reference level time interval hashes for the second reference level time intervals within the respective third reference level time interval.

2. The computerized method of claim 1, further comprising recording at least one of the second reference level time interval hashes to a distributed ledger.

3. The computerized method of claim 1, wherein the first reference level time intervals are seconds, and wherein the second reference level time intervals are minutes.

4. The computerized method of claim 3, wherein the predetermined number of the first reference level time intervals is sixty or sixty-one.

5. The computerized method of claim 1, further comprising generating reference level time interval hashes for at least one additional reference level, wherein each of the at least one additional reference level comprises multiple reference level time intervals, wherein each of the multiple reference level time intervals comprises a predetermined number of previous reference level time intervals, wherein generating each of the additional reference level time interval hashes comprises performing an additional hashing function on the additional reference level time interval hashes of each of the predetermined number of the previous reference level time intervals.

6. The computerized method of claim 1, wherein generating an initial first reference level time interval hash or a first reference level time interval hash for each of the first reference level time intervals other than the initial first reference level time interval is performed regardless of whether any of the data items are received during a respective first reference level time interval, wherein when no data items are received during one of the first reference level time intervals, a placeholder first reference level time interval hash is performed.

7. The computerized method of claim 1, wherein each respective second reference level time interval hash of the multiple second reference level time interval hashes is generated by performing the third hashing function using a second reference level time interval hash of a second reference level time interval immediately preceding the respective second reference level time interval in addition to the first reference level time interval hashes for the first reference level time intervals within the respective second reference level time interval; and
wherein each respective third reference level time interval hash of the multiple third reference level time interval hashes is generated by performing the fourth hashing function using a third reference level time interval hash of a third reference level time interval immediately preceding the respective third reference level time interval in addition to the second reference level time interval hashes for the second reference level time intervals within the respective third reference level time interval.

8. A non-transitory computer-readable storage medium including a set of instructions that, when executed by one or more processors, cause a machine to:
generate reference levels according to time intervals, wherein a first reference level comprises a predetermined number of the time intervals, wherein each of the time intervals of remaining reference levels is comprised of a predetermined number of the time intervals of a previous reference level;
create a genesis hash of genesis data;
create hashes of data at the first reference level in the order in which the data is received by performing a hashing function on the data according to the time interval in which the data is received;
generate an initial first reference level time interval hash for the initial time interval of the first reference level by performing the hashing function using the genesis hash and the hashes of the data within the initial time interval of the first reference level;
generate first reference level time interval hashes for each of the time intervals of the first reference level other than the initial time interval of the first reference level, wherein each respective first reference time interval hash is generated by performing the hashing function using a first reference level time interval hash of a first reference level time interval immediately preceding the respective first reference level time interval and the hashes of the data in the respective first reference level time interval;
generate initial reference level time interval hashes for the remaining reference levels by performing the hashing function using an initial reference level time interval hash and reference level time interval hash for each of a predetermined number of the previous reference level time intervals; and
generate reference level time interval hashes other than the initial reference level time interval hashes for the remaining reference levels, wherein each respective reference level interval hash for a particular level is generated by performing the hashing function using the hashes of the each of the reference level time intervals of the previous reference level within the respective reference level time interval of the particular reference level.

9. The non-transitory computer-readable storage medium of claim 8, wherein the set of instructions, when executed by the one or more processors, further cause the machine to record at least one of the reference level time interval hashes to a distributed ledger.

10. The non-transitory computer-readable storage medium of claim 9, wherein the set of instructions, when executed by the one or more processors, further cause the machine to:
process received verification data spanning a time period of the at least one of the reference level time interval hashes;
generate the reference level time interval hashes for the verification data; and
compare the reference level time interval hash for the verification data with the at least one of the reference level hashes to verify that the verification data is unchanged from the data.

11. The non-transitory computer-readable storage medium of claim 8, wherein the time interval of the first reference level is seconds, and wherein the predetermined number of the time intervals in the first reference level is sixty or sixty-one.

12. The non-transitory computer-readable storage medium of claim 11, wherein the remaining reference levels comprise a second reference level, wherein the time interval of the second reference level is minutes, wherein the predetermined number of the time intervals in the second reference level is sixty.

13. The non-transitory computer-readable storage medium of claim 12, wherein the remaining reference levels further comprise a third reference level, wherein the time interval of the third reference level is hours, wherein the predetermined number of the time intervals in the third reference level is twenty-four.

14. The non-transitory computer-readable storage medium of claim 9, wherein the set of instructions, when executed by the one or more processors, further cause the machine to:
receive a cryptographic signature attesting to the data; and
record at least one of the additional reference level time interval hashes to a distributed ledger.

15. The non-transitory computer-readable storage medium of claim 8, wherein the set of instructions, when executed by the one or more processors, further cause the machine to timestamp the data, wherein creating hashes of data by performing the hashing function on the data at the first reference level includes performing the hashing function on the data with the timestamp.

16. The non-transitory computer-readable storage medium of claim 8, wherein the first reference level time interval hashes are performed regardless of whether the data was received during the time interval, wherein when no data is received during the time interval, a placeholder first reference level time interval hash is performed.

17. The non-transitory computer-readable storage medium of claim 8, wherein each respective reference level interval hash for a particular level is generated by performing the hashing function using a reference level time interval hash of a reference level time interval immediately preceding the respective reference level time interval of the particular reference level in addition to the hashes of the each of the reference level time intervals of the previous reference level within the respective reference level time interval of the particular reference level.

18. A data storage and verification platform, comprising:
one or more processors; and
a computer readable storage medium having instructions stored thereon, which when executed by the one or more processors cause the data storage and verification platform to:
generate reference levels according to time intervals, wherein a first reference level comprises a predetermined number of the time intervals, wherein each of the time intervals of the remaining reference levels is comprised of a predetermined number of the time intervals of a previous reference level;
create a genesis hash of genesis data;
create hashes of data at the first reference level by performing a hashing function on the data according to the time interval in which the data is received, wherein the data is hashed in an order it was received;
generate an initial first reference level interval hash for the initial time interval of the first reference level by combining the genesis hash and the hashes of the data within the initial time interval of the first reference level in a temporal order into a combined hash and performing the hashing function on the combined hash;
generate first reference level time interval hashes for each of the time intervals of the first reference level other than the initial time interval of the first reference level, wherein each respective first reference time interval hash is generated by combining a first reference level time interval hash of a first reference level time interval immediately preceding the respective first reference level time interval and the hashes of each of the data received during each of the time intervals in a temporal order into a respective combined hash and performing the hashing function on the respective combined hash of the data in the respective first reference level time interval;

wherein when the data is not received during any one of the time intervals of the first reference level, a placeholder hash for a first reference level time interval hash is generated;

generate initial reference level time interval hashes for the remaining reference levels by performing the hashing function using an initial reference level time interval hash and reference level time interval hash for each of a predetermined number of the previous reference level time intervals; and generate reference level time interval hashes other than the initial reference level time interval hashes for the remaining reference levels, wherein each respective reference level interval hash for a particular level is generated by combining the hashes of each of the reference level time intervals of the previous reference level within the respective reference level time interval of the particular reference level in a temporal order into a respective combined hash for the respective reference level time interval and performing the hashing function on the respective combined hash for the respective reference level time interval.

19. The data storage and verification platform of claim 18, wherein combining the hashes of each of the data received during each of the time intervals in a temporal order comprises concatenating the hashes of the each of the data.

20. The data storage and verification platform of claim 18, wherein each respective reference level interval hash for a particular level is generated by combining a reference level time interval hash of a reference level time interval immediately preceding the respective reference level time interval of the particular reference level in addition to the hashes of each of the reference level time intervals of the previous reference level within the respective reference level time interval of the particular reference level in a temporal order into a respective combined hash for the respective reference level time interval and performing the hashing function on the respective combined hash for the respective reference level time interval.

* * * * *